(12) United States Patent
Bleier et al.

(10) Patent No.: US 6,659,753 B2
(45) Date of Patent: Dec. 9, 2003

(54) INJECTION UNIT FOR AN INJECTION MOLDING MACHINE

(75) Inventors: Harald Bleier, Wiener Neustadt (AT); Werner Schaffer, Loipersbach (AT)

(73) Assignee: Battenfeld GmbH, Meinerzhagen (DE)

( * ) Notice: Subject to any disclaimer, the term of this patent is extended or adjusted under 35 U.S.C. 154(b) by 17 days.

(21) Appl. No.: 10/029,117

(22) Filed: Dec. 20, 2001

(65) Prior Publication Data

US 2002/0119211 A1 Aug. 29, 2002

Related U.S. Application Data

(63) Continuation-in-part of application No. 09/998,917, filed on Nov. 30, 2001.

(30) Foreign Application Priority Data

Dec. 2, 2000 (DE) .......................... 100 60 087

(51) Int. Cl.[7] ................................ B29C 45/80
(52) U.S. Cl. ........................ 425/145; 425/574
(58) Field of Search ................ 425/145, 542, 425/574, 107

(56) References Cited

U.S. PATENT DOCUMENTS

| | | | |
|---|---|---|---|
| 4,290,701 A | 9/1981 | Schad | |
| 4,695,237 A | 9/1987 | Inaba | 425/135 |
| 4,741,685 A * | 5/1988 | Inaba et al. | 425/145 |
| 4,755,123 A | 7/1988 | Otake | 425/145 |
| 4,758,391 A | 7/1988 | Shimizu et al. | 264/40.5 |
| 4,879,077 A * | 11/1989 | Shimizu et al. | 425/145 |
| 5,891,485 A * | 4/1999 | Emoto | 425/145 |
| 6,325,954 B1 * | 12/2001 | Sasaki et al. | 425/145 |
| 6,365,075 B1 * | 4/2002 | Kamiguchi et al. | 425/145 |
| 6,368,095 B1 * | 4/2002 | Chang | 425/145 |
| 6,386,853 B1 * | 5/2002 | Mizuno et al. | 425/145 |
| 6,443,722 B1 * | 9/2002 | Castelli et al. | 425/145 |

FOREIGN PATENT DOCUMENTS

| | | |
|---|---|---|
| AT | 000 219 U | 5/1995 |
| AT | 002 813 U1 | 4/1999 |
| DE | 196 05 747 A1 | 8/1997 |
| DE | 198 19 809 C1 | 7/1999 |
| EP | 0 245 521 A1 | 11/1987 |
| EP | 0 662 382 A1 | 7/1995 |
| EP | 1 083 036 A1 | 3/2001 |
| GB | 1094037 | 12/1967 |
| JP | 61-16826 | 1/1986 |
| JP | 11123748 | 5/1999 |
| JP | 2000052393 | 2/2000 |
| JP | 2000190361 | 7/2000 |

* cited by examiner

Primary Examiner—Tim Heitbrink
(74) Attorney, Agent, or Firm—Hamilton, Brook, Smith & Reynolds, P.C.

(57) ABSTRACT

Injection unit for an injection molding machine to process material, comprising a plasticizing cylinder, a screw, and a screw drive including two electric motors, such that the two motors have an electrically controlled connection to one another, to implement an injection and metering process, such that the two motors can be operated in the same or opposite direction of rotation and with the same or different rotational speed. A space is formed by at least two sleeves which can move relative to one another, and by respectively adjoining plate members, so as to take up lubricating oil, such that the sleeves can slide into one another, and the junctions of the parts which form the space are constructed tight against the environment, at least for lubricants.

14 Claims, 2 Drawing Sheets

ND ICCTION UNIT FOR AN INJECTION
MOLDING MACHINE

RELATED APPLICATIONS

This application is a continuation-in-part of U.S. application Ser. No. 09/998,917, filed Nov. 30, 2001, which claims priority to German Application 100 60 087.5, filed Dec. 2, 2000, the entire teachings of which are incorporated herein by reference.

BACKGROUND OF THE INVENTION

Machines relating to injection molding machines are generally known. To produce a part from thermoplastic material, granulated plastic is plasticized in an injection molding machine and is metered into the space in front of the screw, and a back pressure is built up in the melt. Usually, the melt is injected into a tool cavity by moving the screw axially. The melt pressure is maintained, that is a holding pressure is built up, so as to compensate the natural material shrinkage. For example, EP 0 662 382 A1 describes an injection unit which is operated by electric motors and which likewise operates by the injection molding process described above. However, here the back pressure in the melt is created by an additional hydraulic apparatus.

A disadvantage of the known methods used by these electric injection molding machines is that an independent hydraulic system, among other things, is used to create and control the back pressure. Because of its complexity, such a system can be very costly. The use of an electric direct drive, where the nut is an integral component of the motor, is a source of disadvantages for this system, as regards cooling, maintenance (lubrication), and service. The motor (metering motor) is held fixed in its position (rpm 0) during injection and during the holding pressure. This results in a relatively high current load on the electronic power sections as long as the injection process lasts. This can raise the temperature above permissible limits, unless the current is reduced early on. This circumstance greatly reduces the capability of this machine in elastomer applications, where extremely long injection and holding pressure times are required.

SUMMARY OF THE INVENTION

In accordance with one aspect of the invention, a machine is provided for operating an injection unit through two electric motors, which is capable of all required injection processes, requires no additional hydraulic equipment, and which is designed for easy maintenance.

In accordance with a particular aspect, a space is formed by at least two sleeves, which can move relative to one another, and by respectively adjoining plate members and hubs so as to take up lubricating oil, such that the sleeves can slide into one another, and the junctions of the parts which form the space are constructed tight against the environment, at least for lubricants. When the screw moves axially, the sleeves push themselves into one another and reduce or enlarge the space. Since this space is filled with lubricant, the relative axial motion of the sleeves, that is a kind of pumping motion, transports the lubricant to the bearing points.

The two motors can be seated offset next to one another, so that they can act on the axle of the screw without any problem. No deflections are thus required.

Another development specifies that a coupling is situated between the screw and the spindle unit, so as to prevent the screw from rotating during the axial motion of the spindle. The coupling can be driven electrically but also hydraulically.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
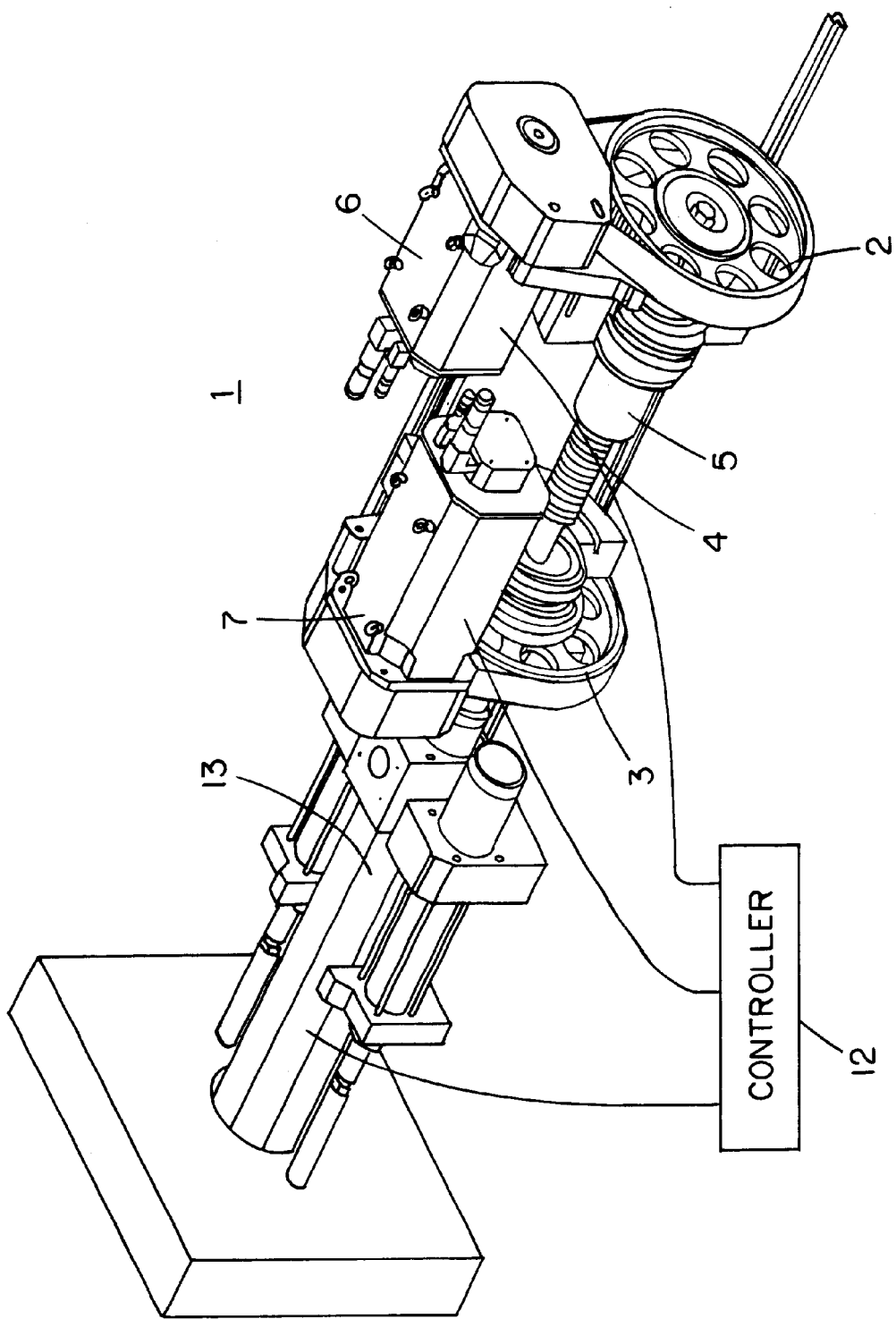
FIG. 1 is a perspective view of one embodiment of an injection unit in accordance with the present invention.

FIG. 1 shows the essential components of the injection unit 1 in perspective. The two motors 6 and 7 for driving the two belt pulleys 2 and 3 are disposed in a plane with the screw within screw housing 13. In one embodiment, the housing 13 is heated to plasticize, i.e., melt, material which can include thermoplastic, wax, thermoset, and elastomer materials. Through the counter-rotation of the motors 6 and 7, or through their rotation with a different rpm, the spindle 4 is moved into or out of the spindle nut 5, and consequently the screw is moved axially. The space A or the parts forming the space A are not shown in FIG. 1 for the sake of clarity. Motors 6 and 7 can also be used to rotate the screw.

Figure 2:
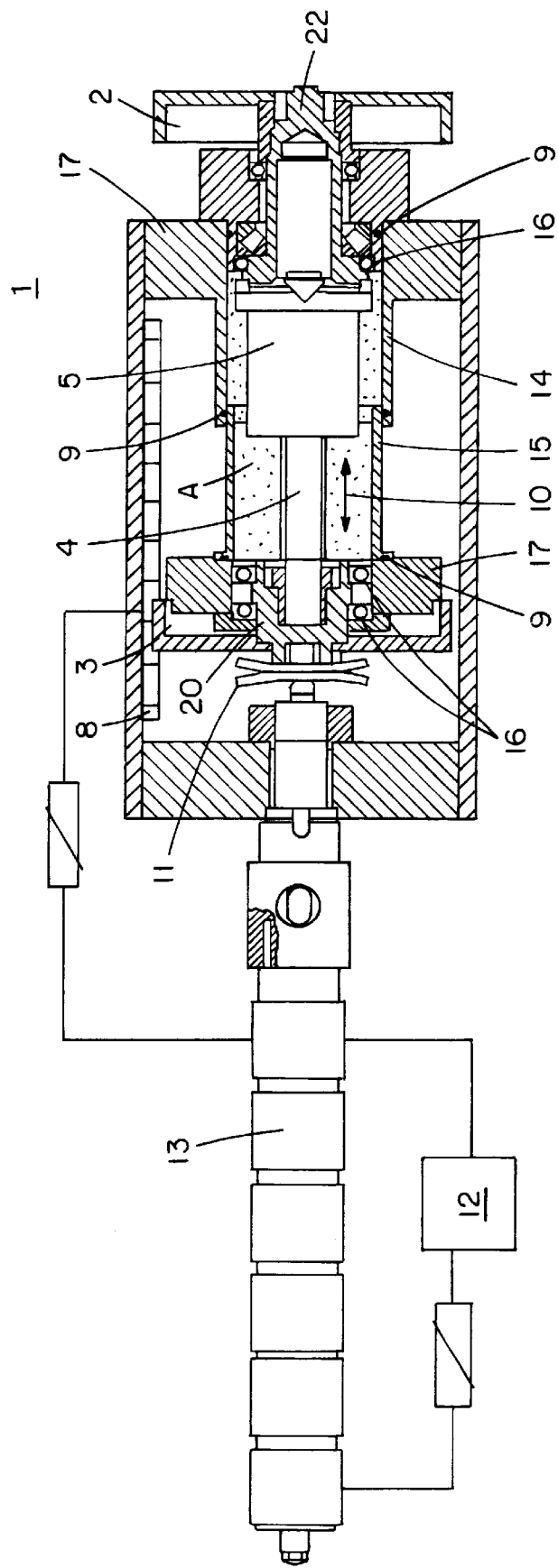
FIG. 2 schematically shows a section through the spindle unit shown in FIG. 1.

FIG. 2 likewise shows the injection unit 1. The two belt pulleys 2 and 3, also the screw, as well as the spindle 4 and the spindle nut 5 are situated on one axle, and consequently can interact directly. If the direction of rotation and the rpm of the belt pulleys 2, 3 are the same, there is no axial motion of the screw. If the direction of rotation or the rpm is different, the spindle 4 is turned into or out of the spindle nut 5. The belt pulley 3 and the plate member 17 with the motor 7 on this same side, and the screw, which is connected to the belt pulley 3, are moved in the direction of the arrow 10. The entire unit is guided by an appropriately designed rail 8.

During this motion, the sleeve 15 is moved into or out of the sleeve 14. This telescopic motion reduces or enlarges the space A, which is formed by the sleeves 14 and 15, hubs 20, 22 and the adjoining plate members 17. The lubricant, e.g. oil, which is situated in the space A, is thus moved, as it were pumped, and thus assures adequate lubrication of the bearing points 16. In a particular embodiment, the space A is not completely filled with lubricant to facilitate the telescopic motion. The space A is constructed tight, at least for lubricant, through sealing means 9, such as O-ring seals.

The current parameters, such as the position of the screw or the position of the belt pulley 3, etc., can be measured by suitable, commercial measurement sensors, can be analyzed by the machine control 12, and can be processed further, for example, as input variables for regulating the rpms of the motors 7 and 6.

The torque on the screw can be eliminated by the schematically shown coupling 11, and in this way the screw can be effectively prevented from turning even though the motors 6 and 7 are running and the screw is making an axial excursion. In one embodiment, the coupling 11 includes two plates that frictionally rub together like a clutch. In another embodiment, the coupling 11 includes two plates that magnetically attach together.

An injection unit can be implemented herein as disclosed in U.S. application Ser. No. 09/999,174, (Attorney's Docket No. 1959.2012-000 (KP 042 US)), which claims priority to German Application 100 60 086.7 filed on Dec. 2, 2000, filed on even date herewith, the teachings of which are incorporated herein in their entirety.

While this invention has been particularly shown and described with references to preferred embodiments thereof, it will be understood by those skilled in the art that various changes in form and details may be made therein without departing from the scope of the invention encompassed by the appended claims.

What is claimed is:

1. An injection unit for an injection molding machine to process a material, comprising a plasticizing cylinder, a screw disposed within the plasticizing cylinder, and a screw drive including two electric motors, such that the two motors have an electrically controlled connection to one another, to implement an injection and metering process, such that the two motors can be operated in the same or opposite direction of rotation and operated with the same or different rotational speed, a space being formed by at least two sleeves, which can move relative to one another, and by respectively adjoining plate members and hubs, so as to take up lubricating oil, such that the sleeves can slide into one another, and the junctions of the at least two sleeves, plate members, and hubs, which form the space are constructed tight against the environment, at least for lubricants.

2. The injection unit of claim 1, wherein lubricant is transported to bearing points, which are positioned adjacent one of the at least two sleeves, through the axial relative motion of the sleeves.

3. The injection unit of claim 1, wherein the motors for the belt pulleys are situated such that they can act on the axle of the screw without deflection.

4. The injection unit of claim 1, wherein a coupling is situated between the screw and the spindle unit, so as to prevent the screw from rotating while the spindle moves axially.

5. The injection unit of claim 1, wherein when at least the combination of a belt pulley and motor moves, the combination of belt pulley and motor are guided in the direction of motion in at least one guide.

6. The injection unit of claim 1, wherein the material includes thermoplastic, wax, thermoset, and elastomer materials.

7. An injection unit for an injection molding machine that processes a material, comprising:
a plasticizing cylinder;
a screw within the plasticizing cylinder, the screw being connected to a spindle;
a screw drive including two motors connected to the screw via the spindle, the two motors having an electrically controlled connection to each other such that the two motors can be operated in the same or opposite direction of rotation and can be operated with the same or different rotational speed; and
at least two sleeves, two plate members, and two hubs surrounding the spindle, the two sleeves configured to slide relative to one another and help form a substantially sealed environment around the spindle.

8. An injection unit for an injection molding machine that processes a material, comprising:
a screw connected to a spindle;
at least two sleeves, two plate members, and two hubs surrounding the spindle, the two sleeves configured to slide relative to one another and form a substantially sealed environment around the spindle with the two plate members and the two hubs; and
at least two motors connected to the spindle to rotate the screw and axially move the screw, the motors being controlled by a controller.

9. An injection unit for use with an injection molding machine that processes a material, comprising:
a screw positioned within a cylinder, the screw being connected to a spindle;
drive means for rotating and axially moving the screw;
at least two sleeves, two plate members, and two hubs surrounding the spindle, the two sleeves slidable into one another to form a substantially sealed environment around the spindle with the two plate members and the two hubs.

10. An injection unit for use with an injection molding machine that processes a material, comprising an injection screw rotatable and axially movable by a first motor and a second motor controlled by a controller, the injection unit also including at least two sleeves surrounding the spindle.

11. The injection unit of claim 10, wherein the two sleeves are slidable into one another.

12. The injection unit of claim 11, further comprising a first plate member connected to the first sleeve and a second plate member connected to the second sleeve.

13. The injection unit of claim 12, further comprising a first hub and a second hub that with the two sleeves and the two plate members form a substantially sealed environment around the spindle.

14. The injection unit of claim 13, wherein the substantially sealed environment is filled at least in part by a lubricant.

* * * * *